US009490076B2

(12) United States Patent
Otani et al.

(10) Patent No.: US 9,490,076 B2
(45) Date of Patent: Nov. 8, 2016

(54) SOLID ELECTROLYTIC CAPACITOR AND MANUFACTURING METHOD THEREFOR

(71) Applicant: MURATA MANUFACTURING CO., LTD., Nagaokakyo-Shi, Kyoto-fu (JP)

(72) Inventors: Shinji Otani, Nagaokakyo (JP); Koji Fujimoto, Nagaokakyo (JP); Yoshihiro Koshido, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/295,626

(22) Filed: Jun. 4, 2014

(65) Prior Publication Data

US 2014/0285951 A1 Sep. 25, 2014

Related U.S. Application Data

(63) Continuation of application No. PCT/JP2012/080706, filed on Nov. 28, 2012.

(30) Foreign Application Priority Data

Dec. 14, 2011 (JP) .................................. 2011-273240

(51) Int. Cl.
| | |
|---|---|
| *H01G 9/00* | (2006.01) |
| *H01G 9/012* | (2006.01) |
| *H01G 9/14* | (2006.01) |
| *H01G 9/15* | (2006.01) |

(52) U.S. Cl.
CPC ............ *H01G 9/012* (2013.01); *H01G 9/0032* (2013.01); *H01G 9/14* (2013.01); *H01G 9/15* (2013.01); *Y10T 29/417* (2015.01)

(58) Field of Classification Search
USPC .................. 361/523, 528, 541; 29/25.03
See application file for complete search history.

(56) References Cited

U.S. PATENT DOCUMENTS

| | | | | |
|---|---|---|---|---|
| 2011/0007451 A1* | 1/2011 | Fran | ..................... | H01G 2/06 361/540 |
| 2012/0194968 A1* | 8/2012 | Kuromi | ................... | H01G 9/04 361/528 |
| 2013/0010404 A1* | 1/2013 | Chiu | ...................... | H01G 9/15 361/526 |

FOREIGN PATENT DOCUMENTS

| | | |
|---|---|---|
| JP | 6-176981 | 6/1994 |
| JP | 2008-135427 A | 6/2008 |
| JP | 2009076872 A * | 4/2009 |
| JP | 2010-272602 A | 12/2010 |

OTHER PUBLICATIONS

PCT/JP2012/080706 Written Opinion dated Feb. 19, 2013.
PCT/JP2012/080706 ISR dated Feb. 19, 2013.

* cited by examiner

*Primary Examiner* — Eric Thomas
(74) *Attorney, Agent, or Firm* — Arent Fox LLP

(57) ABSTRACT

A solid electrolytic capacitor that includes: a laminated body having a plurality of capacitor elements stacked to have principal surfaces thereof overlapped with each other. The capacitor elements each include a valve-action metallic substrate having two principal surfaces opposed to each other, a dielectric oxide film covering a surface of the valve-action metallic substrate, and a cathode layer covering a surface of the dielectric oxide film. The laminated body has two principal surfaces and more than one side surface, and has at least one of the side surfaces with the valve-action metallic substrates exposed. An anode terminal is electrically connected to the side surface of the laminated body having the valve-action metallic substrates exposed therefrom, and the cathode layers and the anode terminal are insulated with insulators interposed therebetween, the insulators being obtained from the cathode layers.

4 Claims, 4 Drawing Sheets

Fig. 5 – PRIOR ART

SOLID ELECTROLYTIC CAPACITOR AND MANUFACTURING METHOD THEREFOR

CROSS REFERENCE TO RELATED APPLICATIONS

The present application is a continuation of International application No. PCT/JP2012/080706, filed Nov. 28, 2012, which claims priority to Japanese Patent Application No. 2011-273240, filed Dec. 14, 2011, the entire contents of each of which are incorporated herein by reference.

FIELD OF THE INVENTION

The present invention relates to a solid electrolytic capacitor and a method for manufacturing the solid electrolytic capacitor.

BACKGROUND OF THE INVENTION

With a reduction in size and an increase in performance for electronic devices, solid electrolytic capacitors as a type of electronic component have been required to be high in electrostatic capacitance per unit volume, that is, volume-to-capacitance ratio. The configuration of this type of conventional solid electrolytic capacitor is shown in FIG. 5.

A solid electrolytic capacitor 201 shown in FIG. 5 is composed of a laminated body 204 that has a plurality of valve-action metallic substrates 203 stacked with dielectric oxide films 202 formed on surfaces thereof. The valve-action metallic substrates 203 are divided by an insulating section 205 provided in a predetermined position into an anode electrode section 206 and a cathode forming section 207. Further, in the cathode forming section 207, the surfaces of the dielectric oxide films 202 are coated with cathode layers 208. In general, this cathode layer 208 includes a conductive polymer layer, a carbon layer, and a silver layer. In addition, an anode terminal 209 and a cathode terminal 210 are connected respectively to the anode electrode section 206 and the cathode layers 208. Furthermore, the laminated body 204 is coated with an exterior body 211. This solid electrolytic capacitor 201 is disclosed in, for example, Patent Document 1.

Patent Document 1: Japanese Patent Application Laid-Open No. 2008-135427

SUMMARY OF THE INVENTION

In this regard, in the case of the solid electrolytic capacitor 201 in FIG. 5, there is a need to secure right-hand regions of the valve-action metallic substrates 203 from the insulating section 205, as the anode electrode section 206 for connection to the anode lead terminal 209. However, the section which contributes to capacitance formation in the solid electrolytic capacitor is only regions of the dielectric oxide films 202 coated with the cathode layers 208. Therefore, the electrostatic capacitance forming section as the regions of the dielectric oxide films 202 coated with the cathode layers 208 is limited to left-hand regions of the valve-action metallic substrates 203 from the insulating section 205. For this reason, the structure of the solid electrolytic capacitor 201 has the problem of limit for further increase in volume-to-capacitance ratio.

The present invention has been achieved in view of the problem mentioned above, and an object of the present invention is to provide a solid electrolytic capacitor with a high volume-to-capacitance ratio, and a method for manufacturing the capacitor.

A solid electrolytic capacitor according to the present invention includes: a laminated body having a plurality of capacitor elements stacked to have principal surfaces thereof overlapped with each other, the capacitor elements each including a valve-action metallic substrate having two principal surfaces opposed to each other and more than one side surface connecting the two principal surfaces, a dielectric oxide film formed to cover a surface of the valve-action metallic substrate, and a cathode layer formed to cover a surface of the dielectric oxide film, the laminated body having two principal surfaces and more than one side surface, and having at least one of the side surfaces with exposed side surfaces of the valve-action metallic substrates; and an anode terminal electrically connected to the side surface of the laminated body with the valve-action metallic substrates exposed, and the cathode layers and the anode terminal are insulated with insulators interposed therebetween, the insulators obtained from the cathode layers.

In addition, in the solid electrolytic capacitor according to the present invention, the insulators are preferably obtained by insulation of the cathode layers located at the side surface of the laminated body with the valve-action metallic substrates exposed.

Furthermore, a method for manufacturing a solid electrolytic capacitor according to the present invention includes: a valve-action metallic substrate preparation step of preparing a valve-action metallic substrate with two principal surfaces opposed to each other; a dielectric oxide film formation step of forming a dielectric oxide film to cover all or multiple surfaces of the valve-action metallic substrate; a capacitor element formation step of forming more than one capacitor element by forming a cathode layer to cover all or multiple surfaces of the dielectric oxide film; a laminated body formation step of forming a laminated body by stacking the capacitor elements to have principal surfaces thereof overlapped with each other, where the laminate body has two principal surfaces and more than one side surface, and has at least one of the side surfaces with exposed side surfaces of the valve-action metallic substrates; a cathode layer insulation step of forming insulators by insulation of the cathode layers located at the side surface of the laminated body with the valve-action metallic substrates exposed; and an anode terminal connection step of electrically connecting an anode terminal to the valve-action metallic substrate exposed at the side surface of the laminated body.

In addition, in the method for manufacturing a solid electrolytic capacitor according to the present invention, the insulators are preferably formed by heating the cathode layers located at a side surface of the laminated body.

The solid electrolytic capacitor according to the present invention has the insulators formed by insulation of the cathode layers located at the side surface of the laminated body, thus making it possible to increase the region which contributes to electrostatic capacitance more than ever in the case of comparison per volume. Therefore, a solid electrolytic capacitor with a high volume-to-capacitance ratio can be provided.

BRIEF EXPLANATION OF THE DRAWINGS

FIG. 5 is a cross-sectional view illustrating a conventional solid electrolytic capacitor.

DETAILED DESCRIPTION OF THE INVENTION

An embodiment for carrying out the present invention will be described below.

Figure 1:
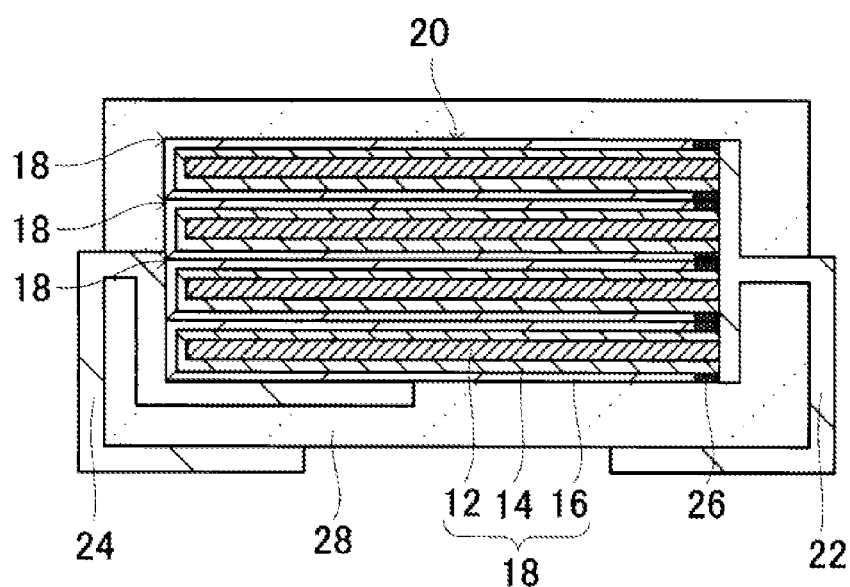
FIG. 1 is a cross-sectional view illustrating a solid electrolytic capacitor according to an embodiment of the present invention.

FIG. 1 is a cross-sectional view illustrating a solid electrolytic capacitor according to an embodiment of the present invention. A solid electrolytic capacitor 10 includes a laminated body 20, an anode terminal 22, a cathode terminal 24, and a resin 28.

The laminated body 20 has two principal surfaces and more than one side surface for connecting the two principal surfaces, and has a plurality of capacitor elements 18 stacked so as to have principal surfaces thereof overlapped with each other. In the present embodiment, the laminated body 20 has a cuboid shape with two principal surfaces and four side surfaces. Further, at least one of the four side surfaces has exposed side surfaces of valve-action metallic substrates 12.

Each individual capacitor element 18 has the valve-action metallic substrate 12, a dielectric oxide film 14, and a cathode layer 16. Further, the cathode layers 16 of the multiple capacitor elements 18 are electrically connected to each other by stacking.

The valve-action metallic substrate 12 has two principal surfaces opposed to each other, and more than one side surface for connecting the two principal surfaces. Examples of the material of the valve-action metallic substrate 12 include tantalum, titanium, aluminum, niobium, zirconium, and alloys containing these metals.

The dielectric oxide films 14 are formed so as to cover the surfaces of the valve-action metallic substrates 12. The dielectric oxide films 14 are composed of oxides of the valve-action metallic substrates 12. In addition, the cathode layers 16 are formed so as to cover the surfaces of the dielectric oxide films 14. Examples of the cathode layers 16 include conductive polymers from thiophene, pyrrole, furan, aniline, derivatives thereof, etc. as monomers.

The anode terminal 22 is joined to the side surface of the laminated body 20, so as to be electrically connected to the side surface of the laminated body 20 with the valve-action metallic substrates 12 exposed. Examples of the method for joining the anode terminal 22 to the laminated body 20 include joining with laser. In addition, the cathode terminal 24 is joined to portions of the side surface and principal surface of the laminated body 20, and electrically connected to the cathode layers 16. Examples of the method for joining the cathode terminal 24 to the laminated body 20 include joining with a conductive paste.

The resin 28 is formed so as to coat the entire laminated body 20. Examples of the material of the resin 28 include an epoxy resin.

In the capacitor element 18, a region where the dielectric oxide film 14 and the cathode layer 16 are formed on the surface of the valve-action metallic substrate 12 refers to a region that contributes to electrostatic capacitance. In the present embodiment, the cathode layers 16 are insulated from the anode terminal 22 with insulators 26 from the cathode layers 16 interposed therebetween. Therefore, in the case of the present embodiment, the entire region of the valve-action metallic substrates 12 other than the region where the insulators 26 are formed will contribute to electrostatic capacitance. Therefore, as compared with conventional cases, the region which contributes to electrostatic capacitance can be increased, and a solid electrolytic capacitor is achieved which has a high volume-to-capacitance ratio.

Next, an example of a method for manufacturing a solid electrolytic capacitor will be described with reference to FIGS. 2(A) through 4.

Figure 2A:
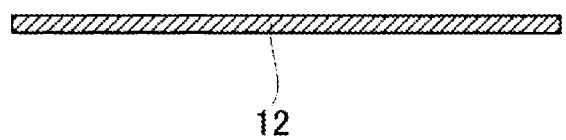
FIGS. 2(A) to 2(D) show cross-sectional views illustrating a method for manufacturing a solid electrolytic capacitor according to an embodiment of the present invention.

First, as shown in FIG. 2(A), a plate-like valve-action metallic substrate 12 is prepared which has two principal surfaces opposed to each other.

Figure 2B:
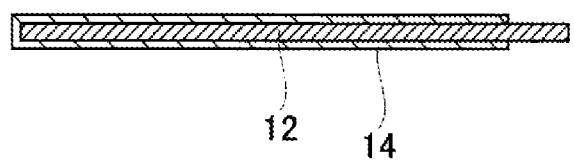

Next, as shown in FIG. 2(B), a dielectric oxide film 14 is formed so as to cover all or multiple surfaces of the valve-action metallic substrate 12. In the present embodiment, the dielectric oxide film 14 is formed so as to cover portions of the principal surfaces of the valve-action metallic substrate 12, and side surfaces other than the side surface which is to be subsequently connected to an anode terminal.

The dielectric oxide film 14 is formed by, for example, an anodization method. In the anodization method, the valve-action metallic substrate 12 is immersed in an electrolytic solution such as phosphoric acid, boric acid, or adipic acid, and current is applied with the valve-action metallic substrate 12 as a positive electrode side and a counter electrode in the solution as a negative electrode side.

Figure 2C:
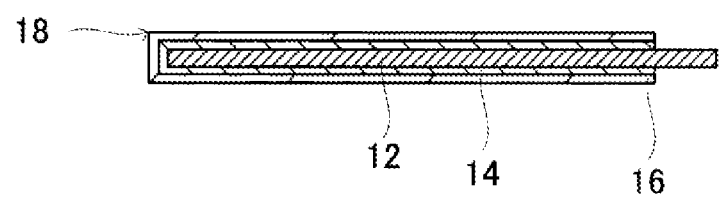

Next, as shown in FIG. 2(C), a cathode layer 16 is formed so as to cover all or multiple surfaces of the dielectric oxide film 14, thereby forming a capacitor element 18. When the cathode layer 16 is composed of a conductive polymer layer, the cathode layer 16 is formed as follows. First, the valve-action metallic substrate 12 with the dielectric oxide film 14 formed is immersed in a monomer solution. The monomer solution includes thiophene, pyrrole, furan, aniline, or other derivative dissolved therein as a solute. Thereafter, the valve-action metallic substrate 12 is immersed in a mixed solution of an oxidant and a dopant to progress a chemical oxidative polymerization reaction, thereby forming a conductive polymer layer. In this reaction, the oxidant serves to initiate the monomer polymerization. In addition, the dopant serves to impart conductivity to the cathode layer 16.

Figure 2D:
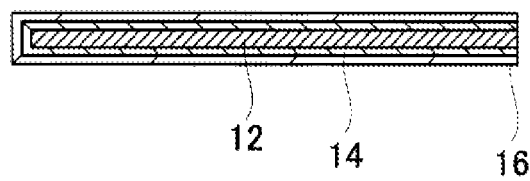

Next, as shown in FIG. 2(D), the valve-action metallic substrate 12 is partially cut off. This cut section is a section of the valve-action metallic substrate 12 on which the dielectric oxide film 14 or cathode layer 16 is not formed. In this way, the capacitor element 18 is obtained which has the valve-action metallic substrate 12 with only an exposed side surface. This step may be skipped in such a way that the dielectric oxide film 14 and the cathode layer 16 are formed so as to cover all of the surfaces of the valve-action metallic substrate 12, other than the side surface which is to be subsequently connected to an anode terminal.

Figure 3E:
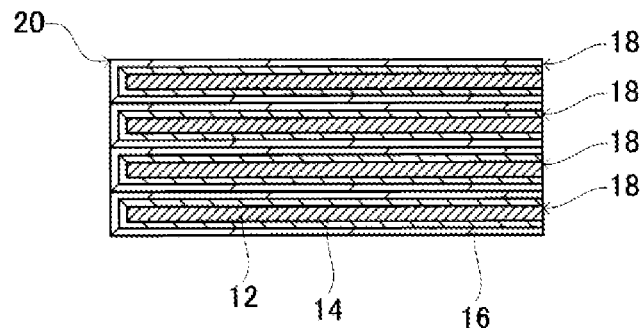
FIGS. 3(E) to 3(G) show cross-sectional views following FIG. 2(D), which illustrate the method for manufacturing a solid electrolytic capacitor according to the embodiment of the present invention.

Next, as shown in FIG. 3(E), multiple capacitor elements 18 are stacked so as to have principal surfaces thereof overlapped with each other, thereby forming a laminated body 20. In the present embodiment, the laminated body 20 has a cuboid shape with two principal surfaces and four side surfaces. Further, at least one of the four side surfaces of the laminated body 20 has exposed side surfaces of the valve-action metallic substrates 12.

It is to be noted that the capacitor elements 18 are cut, and then stacked to form the laminated body 20 in the present embodiment. The side surfaces of the valve-action metallic substrates 12 may be exposed by forming the laminated body 20, and then cutting a portion of the laminated body 20.

Figure 3F:
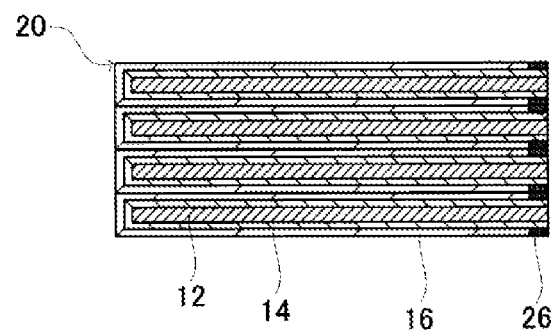

Next, as shown in FIG. 3(F), the cathode layers 16 located at the side surface of the laminated body 20 with the valve-action metallic substrates 12 exposed are insulated to form insulators 26.

In the present embodiment, the cathode layers 16 are insulated by heating to form the insulators 26. Methods for the heating include contact with a heat source such as a heater, hot air, and light irradiation. Alternatively, heat may be used which is generated when the laminated body 20 is joined to an anode terminal 22 as will be described later. The reason why the cathode layers 16 are insulated by heating is believed to be because of dopant desorption or polymer decomposition, for example, in the case of using a conductive polymer layer for the cathode layers 16.

Alternatively, the side surface of the laminated body 20 may be irradiated with laser. In this case, the cathode layers 16 located at the side surface of the laminated body 20 are heated and insulated by the laser irradiation to form the insulators 26.

Figure 3G:
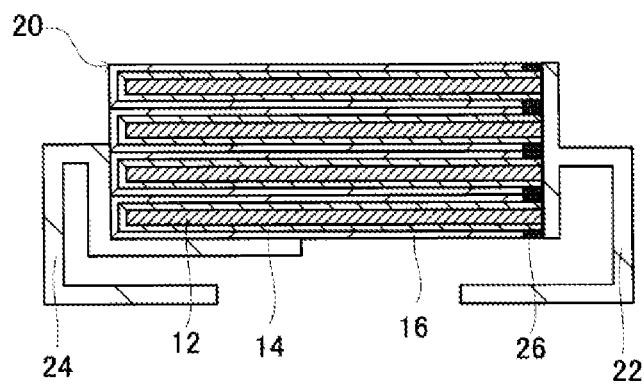

Next, as shown in FIG. 3(G), the valve-action metallic substrates 12 exposed at the side surface of the laminated body 20 are electrically connected to the anode terminal 22. In the present embodiment, the anode terminal 22 is joined so as to be brought into contact with the side surface of the laminated body 20 with the valve-action metallic substrates 12 exposed. In addition, a cathode terminal 24 is joined to a portion of other side surface of the laminated body 20, and a portion of the principal surface thereof. The anode terminal 22 and the cathode terminal 24 may be joined simultaneously. It is to be noted that when an oxide film is produced on the side surfaces of the valve-action metallic substrates 12, the anode terminal 22 may be joined while removing the oxide film on the side surfaces by a known method.

Figure 4:
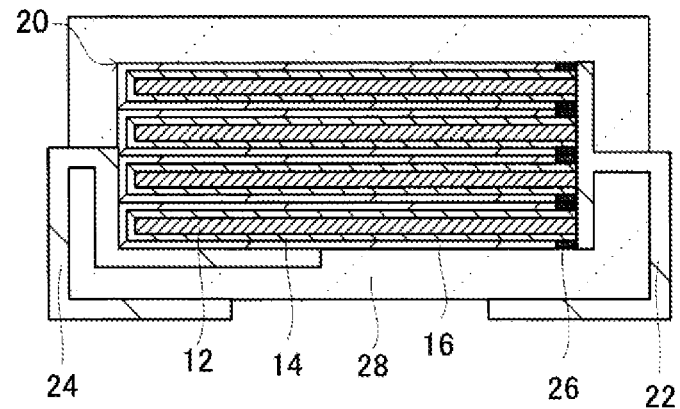
FIG. 4 shows a cross-sectional view following FIG. 3(G), which illustrate the method for manufacturing a solid electrolytic capacitor according to the embodiment of the present invention.
Figure 4:
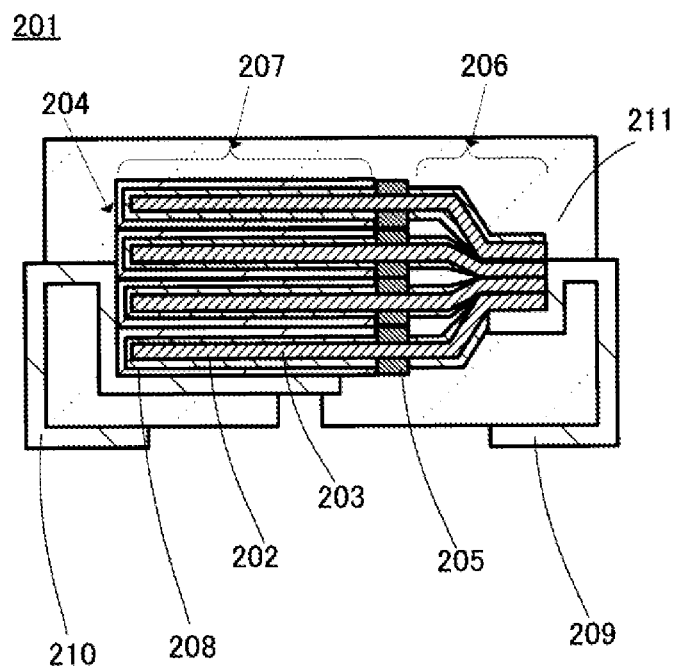

Next, as shown in FIG. 4, a resin 28 is formed so as to coat the entire laminated body 20. The resin 28 is formed so that the anode terminal 22 and the cathode terminal 24 are extracted from the resin 28. In the way as described above, a solid electrolytic capacitor 10 is formed.

It is to be noted that a carbon layer and a silver paste layer may be further formed on the surfaces of the cathode layers 16 of the capacitor elements 18. In this case, the carbon layer and the silver paste layer are preferably formed so as to be kept from reaching the side surface of the laminated body 20 with the valve-action metallic substrates 12 exposed, because the electrical connection of the carbon layer and silver paste layer to the anode terminal 22 results in a failure to function as a capacitor.

In addition, the present embodiment is not limited to the embodiment described above, and various changes can be made thereto without departing from the scope of the invention.

DESCRIPTION OF REFERENCE SYMBOLS 10 solid electrolytic capacitor
12 valve-action metallic substrate
14 dielectric oxide film
16 cathode layer
18 capacitor element
20 laminated body
22 anode terminal
24 cathode terminal
26 insulator
28 resin
201 solid electrolytic capacitor
202 dielectric oxide film
203 valve-action metallic substrate
204 laminated body
205 insulating section
206 anode electrode section
207 cathode forming section
208 cathode layer
209 anode lead terminal
211 resin

The invention claimed is:

1. A solid electrolytic capacitor comprising:
a laminated body having a stacked plurality of capacitor elements, each capacitor element of the stacked plurality of capacitor elements including:
a valve-action metallic substrate having opposed principal surfaces and more than one side surface connecting the opposed principal surfaces,
a dielectric oxide film covering a surface of the valve-action metallic substrate, and
a cathode layer covering a surface of the dielectric oxide film, the cathode layer comprising a conductive polymer,
the laminated body having two principal surfaces and more than one side surface, at least one of the side surfaces of the laminated body having a side surface of the valve-action metallic substrates and a side surface of the dielectric oxide film exposed therefrom; and
an anode terminal electrically connected to the side surface of the laminated body with the valve-action metallic substrates and the dielectric oxide film exposed therefrom; and
insulators interposed between the cathode layers and the anode terminal, the insulators comprising a material contained in the conductive polymer of the cathode layer.

2. The solid electrolytic capacitor according to claim 1, further comprising a cathode terminal electrically connected to the cathode layers.

3. The solid electrolytic capacitor according to claim 1, further comprising a resin covering the laminated body.

4. The solid electrolytic capacitor according to claim 1, wherein the insulators are insulated portions of the cathode layers located at the side surface of the laminated body having the valve-action metallic substrates and the dielectric oxide film exposed therefrom.

* * * * *